Figure 1:
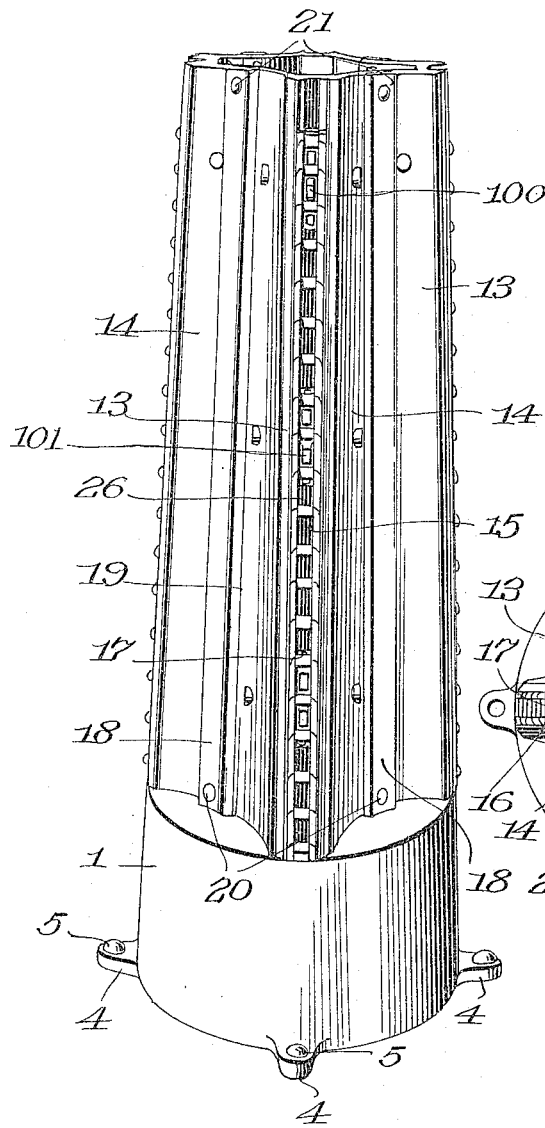

R. W. CARSON.
HOG OILING DEVICE.
APPLICATION FILED NOV. 4, 1914.

1,221,675.

Patented Apr. 3, 1917.
3 SHEETS—SHEET 1.

Witnesses
Inventor
R. W. Carson,
By Victor J. Evans
Attorney

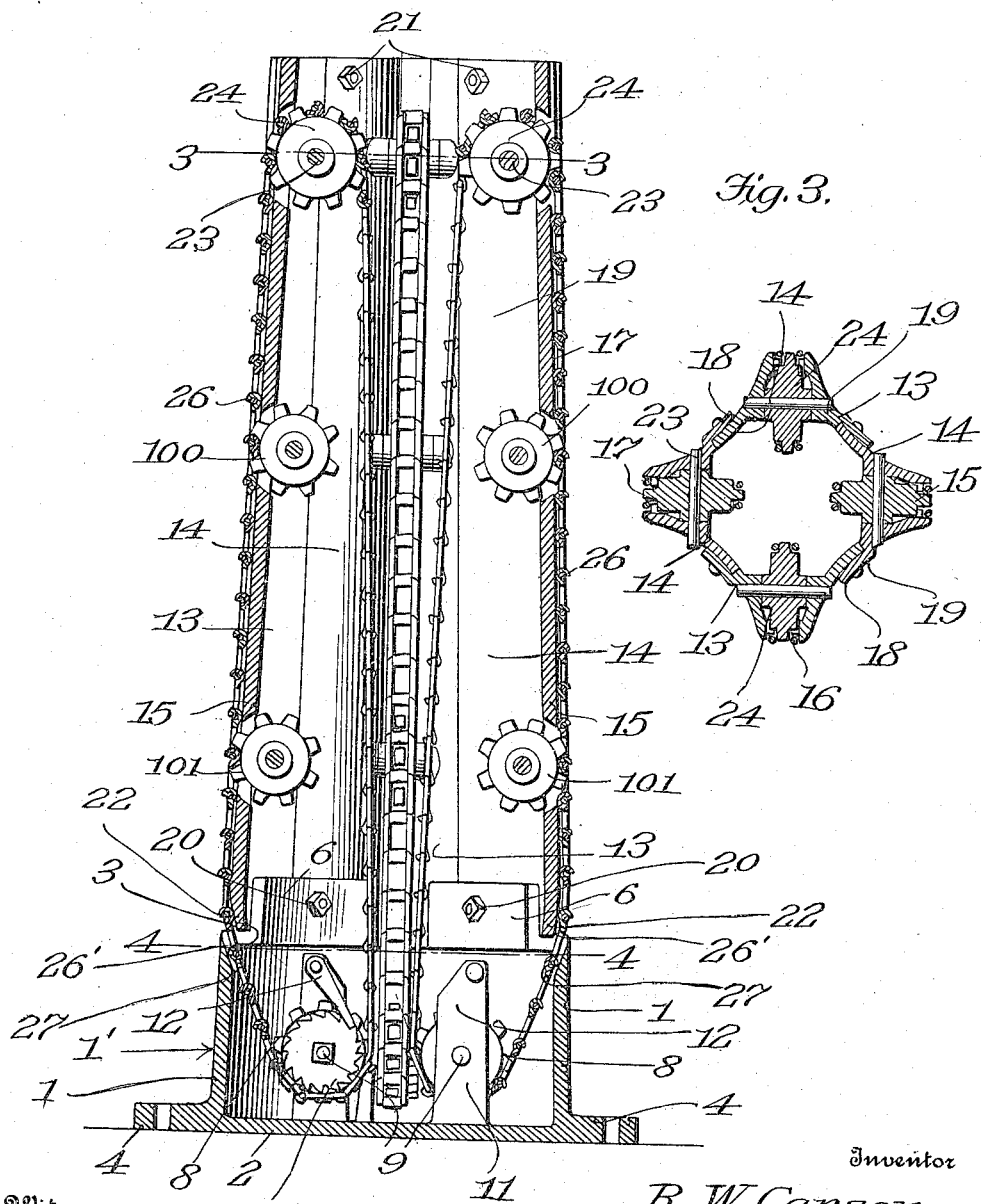

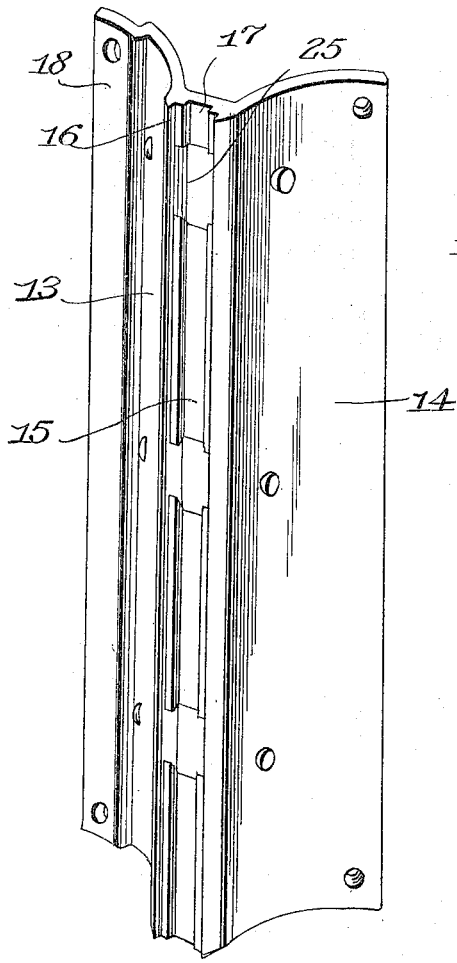
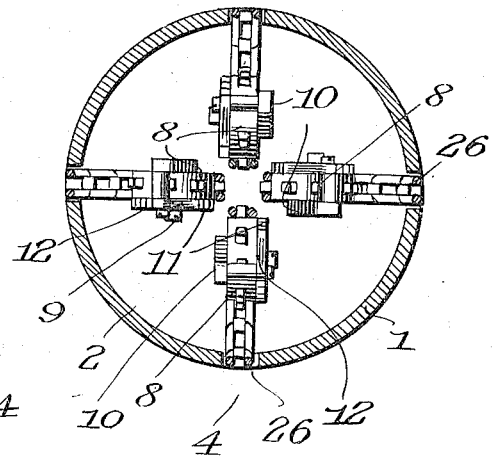
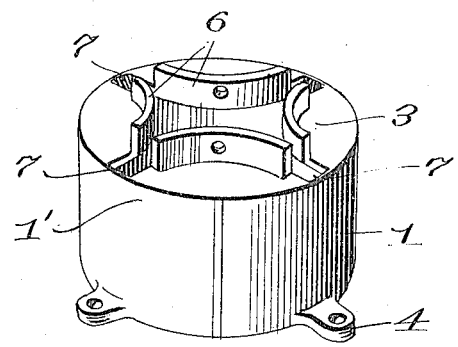

UNITED STATES PATENT OFFICE.

ROBERT W. CARSON, OF ROSSVILLE, INDIANA.

HOG-OILING DEVICE.

1,221,675.   Specification of Letters Patent.   Patented Apr. 3, 1917.

Application filed November 4, 1914. Serial No. 870,285.

*To all whom it may concern:*

Be it known that I, ROBERT W. CARSON, a citizen of the United States, residing at Rossville, in the county of Clinton and State of Indiana, have invented new and useful Improvements in Hog-Oiling Devices, of which the following is a specification.

The present invention relates to devices for applying the fluid to an animal either for medicinal or for insecticide purposes.

In carrying out my invention it is my purpose to produce a device of this character primarily intended for use in applying a medicated oil or ointment or a liquid insecticide to an animal, such as a hog, and wherein the device will be operated by the animal.

Another object of the invention is to construct a device of this character including a reservoir in which ointment or liquid insecticide is placed to provide the same with a plurality of endless chains which move only in one direction, so that the animal rubbing himself in one direction upon the chain will elevate a quantity of the liquid from the reservoir and in moving in an opposite direction to permit of the liquid flowing from the chain upon the animal, and to also so arrange the parts that the surplus liquid or unused liquid will again drain to the reservoir.

A further object of the invention is to provide a device of this character which shall include the desirable features of cheapness and simplicity in construction, strength and efficiency in operation.

With the above and other objects in view, the improvement resides in the construction, combination and arrangement of parts set forth in the following specification and falling within the scope of the appended claims.

Figure 2:
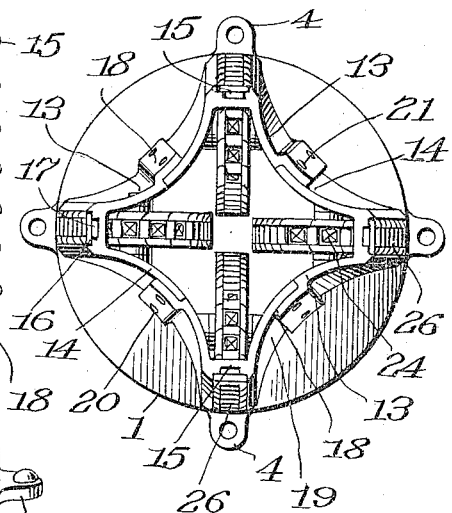

In the drawings:

Figure 1 is a view of a device constructed in accordance with the present invention, Fig. 2 is a top plan view of the same, Fig. 3 is a sectional view on the line 3—3 of Fig. 5, Fig. 4 is a sectional view on the line 4—4 of Fig. 1, Fig. 5 is a vertical longitudinal sectional view on the line 5—5 of Fig. 1, Fig. 6 is a detail perspective view of the bottom section or reservoir, and Fig. 7 is a similar view of one of the side members.

Referring now to the drawings in detail, the numeral 1 designates the base member of the improvement, the same being preferably in the form of a cylinder having a closed bottom 2 and a partially closed top 3. The bottom 2 is provided with outwardly extending flat lugs 4, being preferably arranged in right angular opposite pairs, each of the said ears being provided with a suitable opening for the reception of a securing element 5 whereby the bottom or base 1 is sustained in a vertical position. The top 3 of the base 1 has its open portion provided with oppositely disposed arcuate flanges 6, the same being preferably four in number, while the said top is provided with substantially rectangular openings 7 arranged at the adjacent ends of each pair of arcuate flanges 6 and the said rectangular openings terminate preferably with the inner peripheral wall of the base. The base forms a reservoir within which is arranged the liquid to be applied to the animal, and arranged within the said base at a suitable distance to the rear of the end walls of each of the rectangular openings 7 is a sprocket wheel 8, each of said wheels having their shafts or trunnions 9 journaled in suitable bearings 10 provided upon the base or bottom of the reservoir 1. The teeth of the sprocket wheel 8 are only a slightly less thickness than the width of the rectangular opening 7, and one of said sprocket wheels is arranged adjacent each of said rectangular openings, so providing the device with four sprocket wheels. Preferably integrally formed upon one of the sides of each of the sprocket wheels 8 is a ratchet wheel 11, and each one of the standards 10 providing the journals for one of the trunnions 9 of each of the sprocket wheels 8 has arranged thereon a gravity pawl 12, one of each engaging with each of the ratchet wheels 11 to prevent the rotation of the said wheel and consequently the rotation of the sprocket in one direction.

The body of the device is made up of a plurality of members which, for the sake of convenience, will be referred to as the sides. The sides, in the present instance, are four in number and are of a similar construction, each including oppositely curved side flanges 13 and 14 respectively, the inner faces of which correspond with the arcuate flanges 6 of the base or reservoir 1, and the outer portions of the flanges 13 have a connecting plate 15. This plate, upon its outer face, is formed with a comparatively shallow longitudinally extending recess or channel 16, and a centrally arranged deeper recess or channel 17. The end of the curved flange 13 of each of the side members is provided with a longitudinally extending offset flange or rib 18, the distance between the inner face of the same and the inner face of the member 13 corresponding with the thickness of the member 14 at the end thereof, and the members 13 and 14, of each of the sides which, for convenience, may be designated by the numerals 19, contact with the outer walls of the arcuate or curved flanges 6 of the base and are secured thereto preferably through the medium of rivets 20. The flange or rib 18 is adapted to receive the end of the side flange 14, suitable rivets 21 passing through the same, so that all of the side members are securely connected together and securely connected with the base or reservoir. It is to be stated that the connecting member 15 has its inner wall contacting with the ends of the opposite arcuate flanges 6 between which is provided one of the rectangular openings 7, which arrangement more securely reinforces the members 19 at the bottom or lower portions thereof.

The connecting members 15 of each of the sections 19, have the lower ends of their channeled portions rounded inwardly over the openings 7, as indicated by the numerals 22. The members 13 and 14 adjacent the top of each of the sections 19 are formed with registering round openings, the said openings providing bearings within which are journaled the shafts 23 of sprocket wheels 24, and the teeth at the outer end of these sprocket wheels pass through suitable openings 25 provided in the member 15 of each of the said sections 19.

The numerals 26 designate endless chains which are mounted upon each pair of opposite sprocket wheels 11 and 24, the said sprocket chains having their outer leads following the curved walls 26' provided in the lower ends of each of the sections 19 and are thus disposed a considerable distance away from the outer walls of the rectangular openings 17, it being understood, as previously stated, that the sprocket wheels 11 are disposed a suitable distance to the rear of the end walls of the said rectangular openings 7, and further, and as illustrated in Fig. 5 of the drawings, the outer walls provided by the rectangular openings 7 may be beveled, as at 27, in which instance, the outer faces of the connecting members 15 may be disposed flush with the outer face of the base or reservoir 1'. The members provided with the chain receiving channels are so arranged upon the reservoir 1 that the surplus oil or other lubricant carried by the chains will drain through the channels and through the openings 7 to the reservoir, so an unnecessary waste of lubricant will not occur.

The device is particularly adapted for applying either a medicated fluid or a liquid insecticide to a hog. As is well known to stock breeders a hog rubs himself with an up and down movement. The dog 12 engaging with the teeth of the ratchet wheel 11 permits of the chain 26 moving only in the direction of the arrow. Thus when a hog rubs himself against any one of the chains the contact with the connecting members 26' of the chain 26 will elevate the chain when the hog raises himself in his rubbing or scratching movement. In moving in the opposite or downward direction the fluid will be removed from the chain by the contact of the hog and deposited upon the body of the hog, and also the surplus fluid, will, as previously stated, be returned to the reservoir.

It will be noted that by providing the sections 19 with the arcuate sides, the animal cannot conveniently contact with any portion of the device except that upon which the chains are arranged. It will be further noted that the edges of the grooves or channels provided in the outer faces of the sections 19 form scraper members to remove surplus liquid from the hog to permit of the same draining to within the reservoir.

In some instances it has been found that the chains will not readily rotate after being contacted by a hog who has wallowed in the mud as the mud clogs the chain and in order to prevent this I provide each of the chains with what I term cleaning wheels, the upper wheels being indicated by the numerals 100, and the lower wheels being indicated by the numerals 101. These wheels are provided with spaced teeth which pass between the links of the chain, causing the clogging substance therebetween to be removed, as will readily be understood.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a device for the purpose set forth, a reservoir, sprocket wheels within the reservoir, means for preventing the movement of the sprocket wheels in one direction, a vertical casing upon the reservoir, said casing comprising a plurality of connected sections, each of said sections having one of its faces arranged adjacent the outer face of the reservoir, each of said sections being provided with a vertically arranged chain channel, endless chains trained over the sprocket wheels, each of said chains having its outer lead arranged in one of the chain channels, and a sprocket upon each of the sections for each of the endless chains.

2. In a device of the class set forth, a liquid containing reservoir, a casing arranged over the reservoir and communicating therewith, said casing having outer faces which are arranged flush with the outer faces of the reservoir, and which are provided with vertically arranged channels, and said channels communicating with the reservoir, and sprocket wheels within the casing and the reservoir, a ratchet wheel upon the sprocket in the reservoir, a gravity pawl engaging the sprocket wheel, and a sprocket chain for the wheels having its outer lead arranged in the channel of the casing.

3. In a device for the purpose described, a reservoir having a closed bottom and a partially closed top, the open portion of the top having its edges formed with oppositely arranged arcuate flanges and having rectangular openings extending outwardly between each pair of flanges, a casing made up of sections, each including side arcuate members and a straight connecting member, means for securing the members to the flanges, means for connecting the members, the straight face of each of the members having its outer face channeled and provided with an opening adjacent its top, and said channels communicating with the rectangular openings in the reservoir, a sprocket wheel journaled adjacent the opening in the outer face of each of the sections, a sprocket wheel journaled to the rear of each of the rectangular openings in the reservoir, each of the last mentioned sprocket wheels being provided with a ratchet wheel, a gravity pawl engaging the ratchet wheel, an endless chain upon the opposite sprockets, and said chain having its outer lead arranged within the channel in the face of the connecting member of the sections.

4. In a device for the purpose set forth, a reservoir, sprocket wheels within the reservoir, means for preventing the movement of the sprocket wheels in one direction, a vertical casing upon the reservoir, sprocket wheels journaled adjacent the top of said casing, chains having their outer leads arranged adjacent the outer face of the reservoir and engaging with each of the sprocket wheels within the reservoir and with each of the sprocket wheels journaled in the casing, and toothed cleaning wheels journaled in the casing and arranged between the aforementioned sprocket wheels.

5. In a hog oiling device, an oil casing, sprocket wheels, vertically disposed endless chains trained over the sprocket wheels and communicating with the casing and having their outer leads disposed on the outer face of the said casing, and means for preventing the movement of the chains in one direction.

6. In a device for the purpose set forth, an oil casing, means for securing the casing upon a support, sprocket wheels, endless chain conveyers trained over the sprocket wheels and communicating with the interior of the casing, said chains having their outer leads disposed on the outer face of the casing, and means for preventing the movement of the chains in one direction.

7. An animal oiler adapted to be actuated by an animal rubbing against the same comprising an oil reservoir, an oil collector movable thereinto and having an inner lead moving directly into the oil reservoir and an outer lead moving from the oil reservoir and against which the animal is adapted to contact, guide means for the contact lead, means for preventing the movement of said lead in the direction of the reservoir, and rotary supports for the collector.

In testimony whereof I affix my signature in presence of two witnesses.

ROBERT W. CARSON.

Witnesses:
OMER A. BEYDLER,
JESSE M. BEYDLER.